Sept. 23, 1924.

J. A. GROSVENOR

AIR PUMP

Filed June 23, 1923

1,509,595

Inventor:
JOHN A. GROSVENOR

By Monroe E. Miller
Attorney.

Patented Sept. 23, 1924.

1,509,595

UNITED STATES PATENT OFFICE.

JOHN A. GROSVENOR, OF MONTE VISTA, COLORADO, ASSIGNOR OF FORTY PER CENT TO WILLIAM M. VASTINE AND FORTY PER CENT TO JAMES P. VEERKAMP, BOTH OF MONTE VISTA, COLORADO.

AIR PUMP.

Application filed June 23, 1923. Serial No. 647,334.

*To all whom it may concern:*

Be it known that I, JOHN A. GROSVENOR, a citizen of United States, residing at Monte Vista, in the county of Rio Grande and State of Colorado, have invented certain new and useful Improvements in Air Pumps, of which the following is a specification, reference being had therein to the accompanying drawing.

The present invention relates to air pumps, such as are used for inflating pneumatic tires, and for similar purposes, and the invention aims to provide a double acting pump having novel and improved features of construction providing for certain advantages, as will hereinafter more fully appear.

Another object of the invention is the provision of such a pump having in combination with a tubular air entry piston rod, a piston of novel and improved construction and provided with check valves for preventing the escape of the air from the opposite sides of the piston through the piston rod.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1:
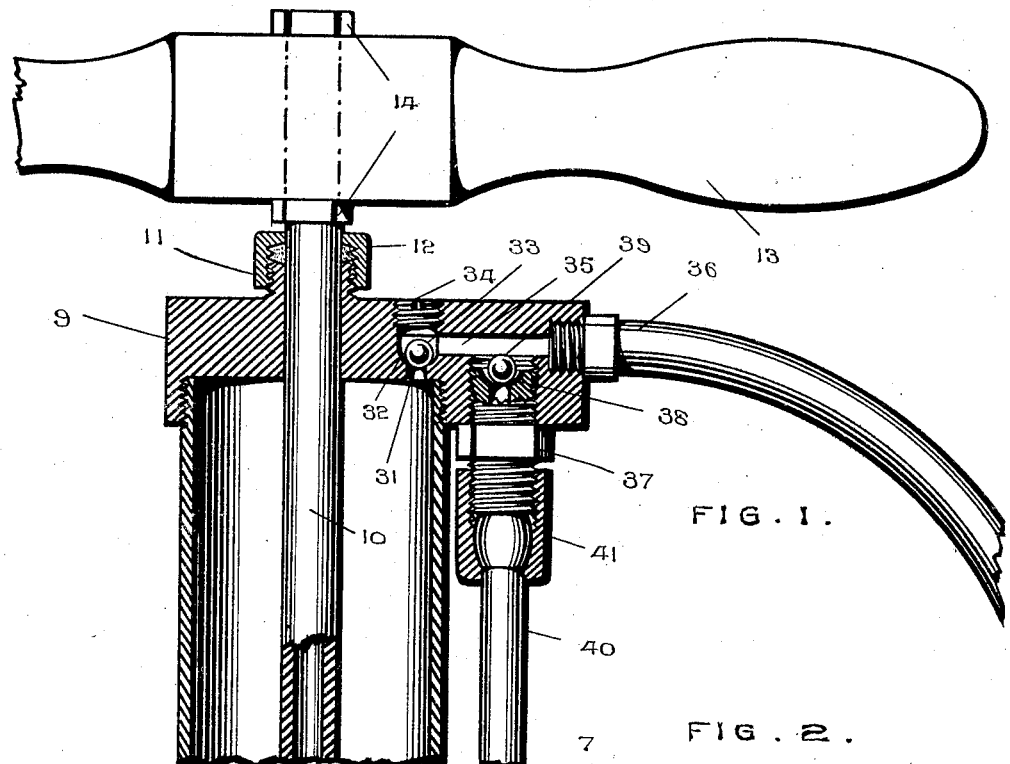
Figure 1 is a longitudinal median section of the improved pump, portions being broken away and portions shown in elevation.
Figure 2:
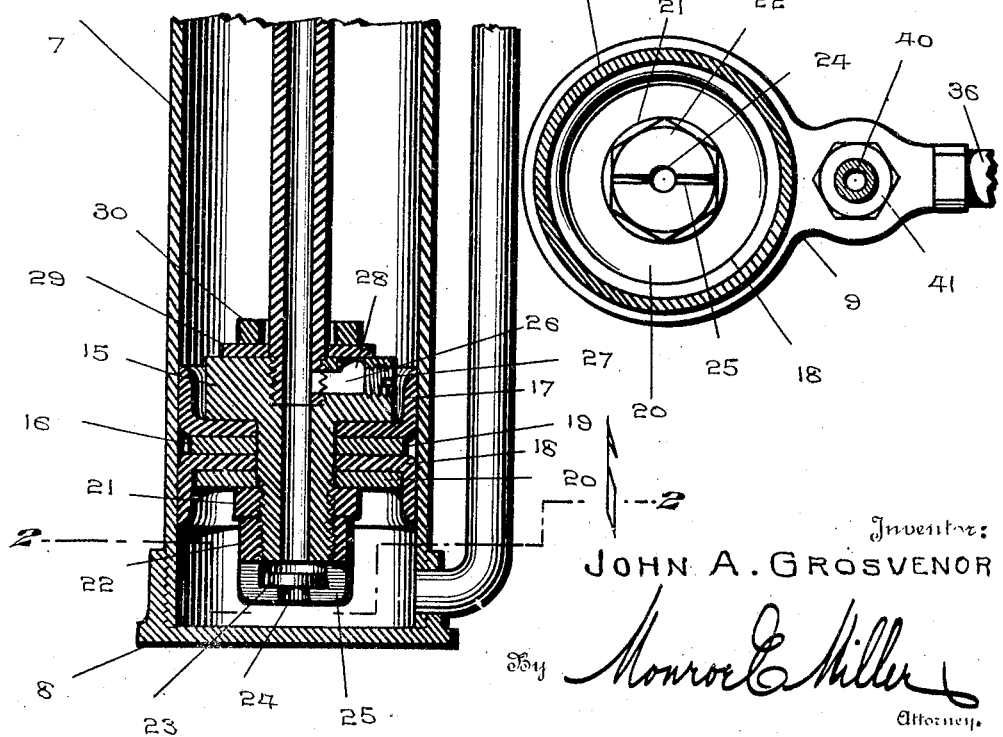
Fig. 2 is a cross section on the line 2—2 of Fig. 1.

The pump cylinder 7 may be of suitable size, and its lower end is secured to a suitable base 8, and a head or cap 9 is screw-threaded or otherwise detachably secured on the upper end of the cylinder. The piston rod 10 extends slidably through the head or end member 9 of the cylinder, and said head has a boss 11 upstanding therefrom through which the piston rod extends, and a packing nut 12 is threaded on said boss to contain packing for embracing the piston rod to prevent leakage.

A suitable handle 13 is fitted on the upper protruding terminal of the piston rod, being held between a pair of nuts 14 threaded on the rod, whereby the piston can be reciprocated manually in the usual manner.

The piston rod 10 is tubular and the air admitted to the cylinder flows in by way of the piston rod, the air passing into the upper or outer end of the piston rod and into the cylinder by way of the piston.

The piston includes a member 15 of less diameter than the cylinder and screw-threaded on the lower or inner end of the piston rod, and said member has a tubular extension or nipple 16 projecting downwardly or away from the piston rod, said extension being coaxial with the piston rod, and the passages of said extension and piston rod being in registration for the flow of air through them. The packing cups 17 and 18 of leather or other suitable material are fitted on the extension 16, and their rims extend in opposite directions away from one another, the rim of the cup 17 surrounding the member 15. A washer or disk 19 is fitted on the extension 16 between the packing cups, and a washer or disk 20 is fitted on said extension within the cup 18, whereas the cup 17 bears against the member 15. A retaining nut 21 is screw-threaded on the extension or nipple 16 and bears against the washer 20, whereby said nut in being tightened will clamp the cups 17 and 18 and washers 19 and 20 between the member 15 and nut 21.

Air is admitted from the piston rod 10 through the extension of nipple 16 into the lower chamber of the cylinder, below the piston, and a check valve is provided to prevent the reverse flow from the lower chamber back through the extension or nipple 16. Thus, a cap 22 is screw-threaded on the end portion of the extension 16, and may be used as a nut to assist in clamping the packing cups and washers against the member 15. A disk valve 23 of leather or other suitable material is disposed loosely in the cap 22 to seat against the end of the extension 16 across the passage of said extension. The cap 22 has a central aperture 24, and a diametrical slot or kerf 25 intersecting the aperture 24 and permitting the flow of air past the valve 23 when it is seated in the cap over the aperture 24, as seen in Fig. 1.

The piston also has means for the flow of air from the piston rod into the upper air chamber of the cylinder above the piston, and a check valve is provided to prevent reverse flow from said chamber back through the piston rod.

Thus, a radial hole or bore 26 is drilled or otherwise provided in the member 15 and opens through the terminal portion of the piston rod 10 to communicate with the passage of said piston rod, the outer end of hole or bore 26 being closed by a screw-plug 27 or other closure. The member 15 has an aperture 28 extending from the upper surface thereof to the hole or bore 26, whereby the hole 26 and aperture 28 provide an angular port leading from the passage of the piston rod 10 to the upper end or surface of the piston, for the flow of air from the piston rod into the upper air chamber. An annular valve 29 of leather or other suitable material is disposed on the member 15 around the piston rod 10 to seat over the aperture 28, and a ring 30 is disposed loosely around the piston rod to seat on the valve 29 and provide a weight to assist in holding the valve 29 down on the member 15.

It will be noted that the piston is a unit separate and distinct from the piston rod, and the piston and piston rod can be separated by unscrewing the member 15 from the piston rod, thus providing a convenient and desirable arrangement. The parts of the piston are also readily manufactured and assembled, and the packing cups are securely fastened in place without interfering with the admission of air and the operation of the check valves.

The air is discharged from the upper air chamber of the cylinder through an outlet port 31 in the lower or inner surface of the head 9, said head having a valve seat 32 above said port on which a ball check valve 33 is seatable to prevent the entrance of air through the port 31. A removable screw plug 34 is threaded in the head 9 above the valve seat 32, whereby when said plug is removed, access is provided to the valve 33 and its seat. The head 9 has an outlet passage 35 extending from over the valve seat 32, and the hose 36 or other conductor for the air is coupled to the head 9 in communication with the passage 35, a screw-threaded or other suitable detachable coupling being provided between the hose 36 and head 9.

A nipple 37 is screw-threaded upwardly into the head 9 at one side of the cylinder 7 below the passage 35 in communication with said passage, and the upper end of the nipple has a valve seat 38 for a ball check valve 39 to prevent the entrance of air downwardly through the nipple 37. The air is discharged from the lower air chamber of the cylinder through a metal tube or pipe 40 which has its lower end engaging through and soldered or otherwise secured to the cylinder 7 and base at the lower end of the cylinder. The tube or pipe 40 extends vertically at one side of the cylinder and the upper end of said tube is secured to the nipple 37 by a union 41.

The pump is double acting, in that the air is discharged under pressure during each of the upward and downward strokes of the piston. When the piston rod is moved upwardly, the valve 29 seats over the aperture 28, so that the air in the upper air chamber is forced through the port 31 past the valve 33 into the hose or tube 36. At the same time, air is admitted to the lower air chamber from the piston rod 10 through the extension 16 past the valve 23 and through the slot 25. The valve 39 remains seated to prevent air flowing through the tube or pipe 40 into the lower air chamber. Then, when the piston is moved downwardly, the air rushing up through the aperture 24 of the cap 22 will seat the valve 23 against the end of the extension or nipple 16, and the air is forced from the lower air chamber through the tube 40 and past the valve 39 into the hose 36, the valve 33 remaining seated to prevent the entrance of air through the port 31 into the upper air chamber. The air enters the upper end chamber from the piston rod 10 through the air inlet port in the member 15, the valve 29 being raised or unseated.

The pump being double acting will double the output of compressed air, in order that tires can be inflated in less time and with less manual effort than with a single acting pump.

Having thus described the invention, what is claimed as new is:—

1. In a pump, a tubular air entry piston rod, a member secured on the inner end of said rod and having a tubular extension in communication with said rod, packing means on said extension, a nut screw-threaded on said extension for clamping the packing means against said member, a cap screw-threaded on said extension and bearing against said nut, a valve in said cap to seat against the end of said extension for preventing the reverse flow of air back through the extension and piston rod, said cap being slotted for the flow of air therethrough, said member having a port for the flow of air from said rod to the side opposite to said extension, and a check valve for closing said port to prevent the reverse flow of air back to said rod.

2. In a pump, a tubular air entry piston rod, a member secured on the inner end of said rod and having a tubular extension in communication with said rod, packing means on said extension, means on said extension for clamping said packing means against said member, a check valve for closing the passage of said extension to prevent the reverse flow of air back through said extension and rod, said member having a port for the flow of air from said rod to the side of said member opposite to said extension, and a check valve for closing said port to prevent the reverse flow back through said rod.

3. In a pump, a tubular air entry piston rod, a member secured on the inner end of said rod and having a tubular extension in communication with said rod, packing means on said extension against said member, means on said extension for clamping said packing means against said member. a cap secured on said extension and slotted for the passage of air, a check valve in said cap seatable against the end of said extension, said member having a port for the discharge of air from said rod to the side of said member opposite to said extension, and a valve surrounding said rod to seat across said port to prevent the reverse flow of air back through said port and piston rod.

In testimony whereof I hereunto affix my signature.

JOHN A. GROSVENOR.